Dec. 9, 1941.  R. W. BROWN ET AL  2,265,346
APPARATUS FOR SHAPING HOLLOW DISTENSIBLE STRUCTURES
Filed May 17, 1938  4 Sheets-Sheet 1
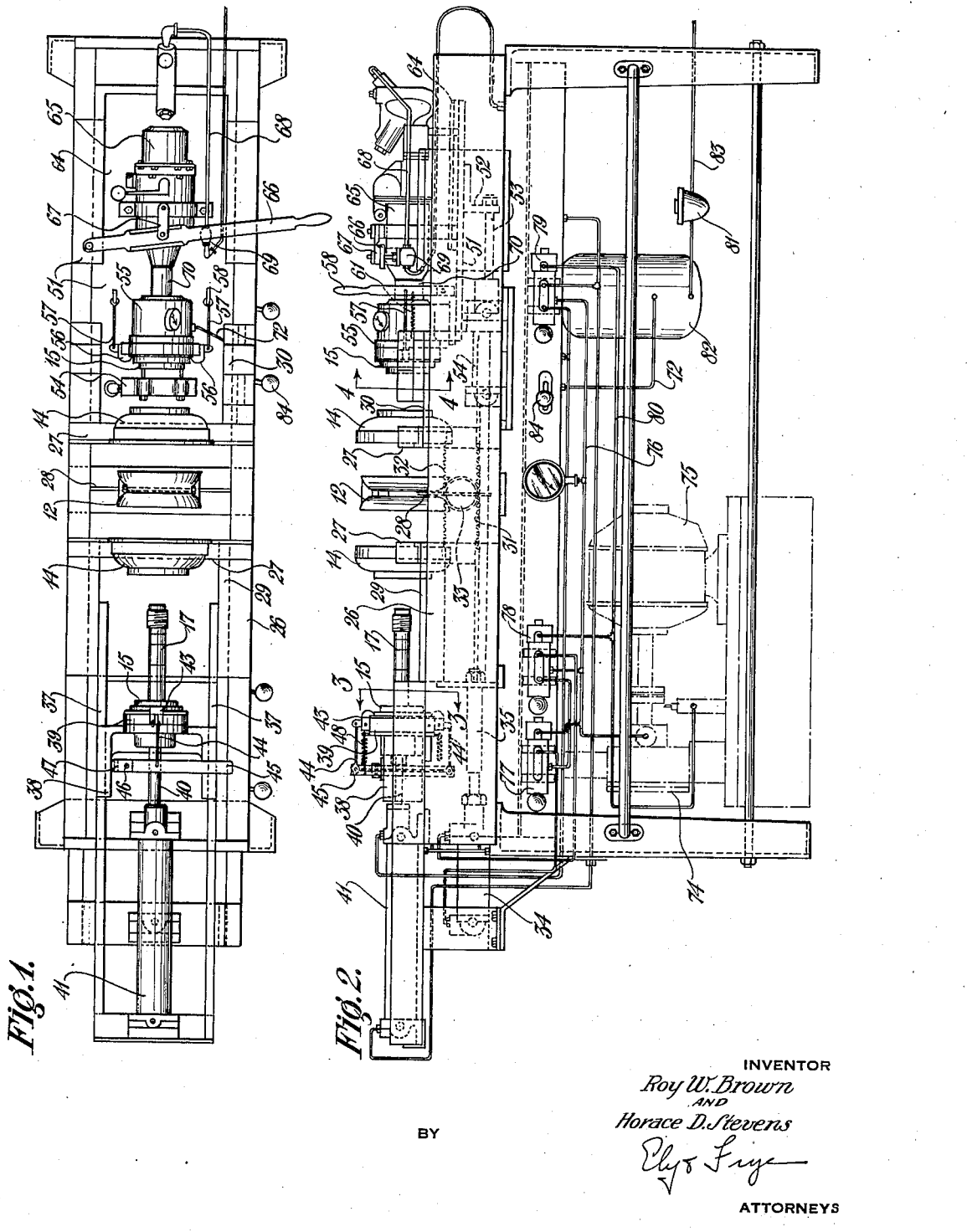
INVENTOR
Roy W. Brown
AND
Horace D. Stevens
BY
ATTORNEYS Dec. 9, 1941.  R. W. BROWN ET AL  2,265,346
APPARATUS FOR SHAPING HOLLOW DISTENSIBLE STRUCTURES
Filed May 17, 1938  4 Sheets-Sheet 2

INVENTOR
Roy W. Brown
AND
Horace D. Stevens
BY
ATTORNEY

Patented Dec. 9, 1941

2,265,346

UNITED STATES PATENT OFFICE 2,265,346

APPARATUS FOR SHAPING HOLLOW DISTENSIBLE STRUCTURES

Roy W. Brown and Horace D. Stevens, Akron, Ohio, assignors to The Firestone Tire & Rubber Company, Akron, Ohio, a corporation of Ohio Application May 17, 1938, Serial No. 208,435

13 Claims. (Cl. 18—2)

This invention relates to apparatus for shaping hollow, distensible structures, and more especially it relates to apparatus for confining a hollow structure in a mold cavity of definitely different shape than the structure and concurrently distending the structure to cause it to conform to the shape of said mold cavity.

The apparatus is of especial utility in the manufacture of bellows shaped pressure containers of reinforced vulcanized rubber such as are used in pneumatic suspension systems for vehicles. The containers, constructed of unvulcanized rubber reinforced with plies of cord fabric, initially are substantially of hollow cylindrical form, and require to be shaped to bellows form by local distension of annular regions on opposite sides of the middle thereof, before the rubber thereof is vulcanized.

The chief objects of the invention are to provide improved apparatus for altering the shape of a distensible structure from hollow cylindrical form to bellows shape; and to provide shaping apparatus of the character mentioned wherein a portion thereof constitutes a mold in which the shaped structure may be vulcanized. Other objects will be manifest as the specification proceeds.

Of the accompanying drawings:

Figure 1 is a plan view of apparatus embodying the invention, in its preferred form;

Figure 2 is a front elevation thereof as viewed from the near side of Figure 1;

Figure 3:
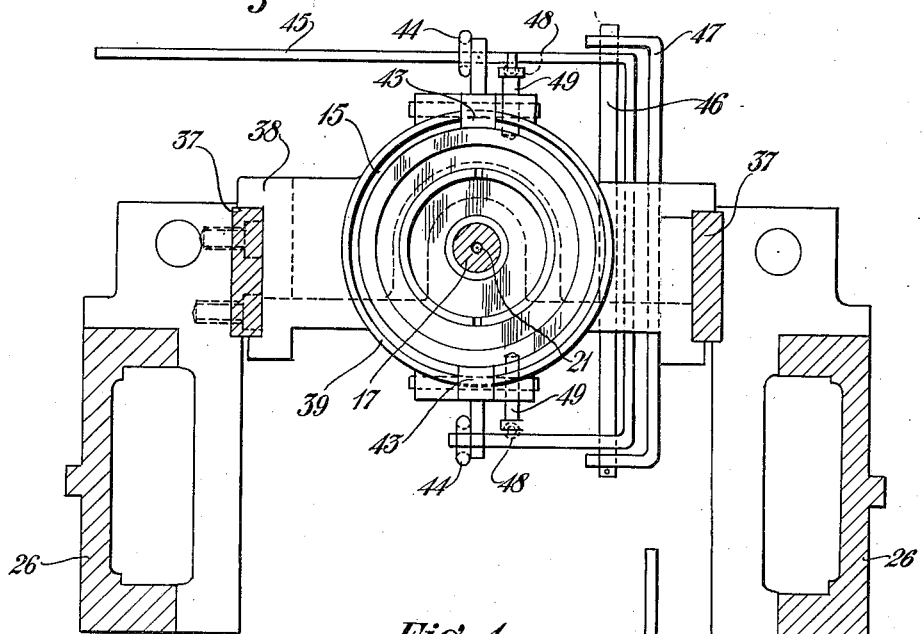
Figure 3 is a section, on a larger scale, on the line 3—3 of Figure 2.
Figure 4:
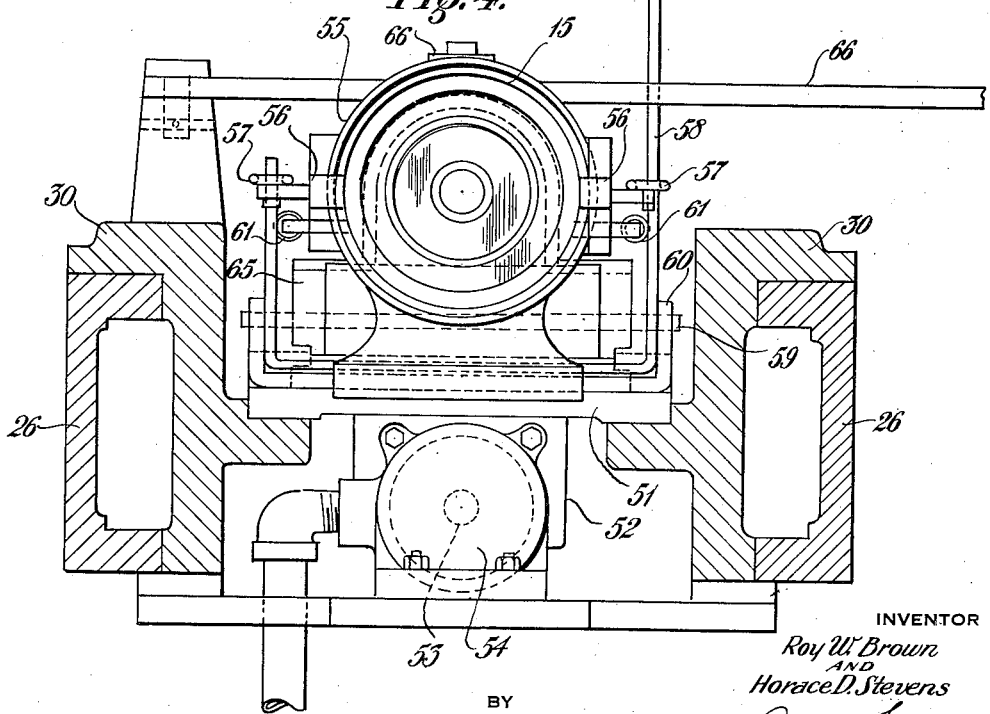
Figure 4 is a section, on a larger scale, on the line 4—4 of Figure 2.
Figure 5:
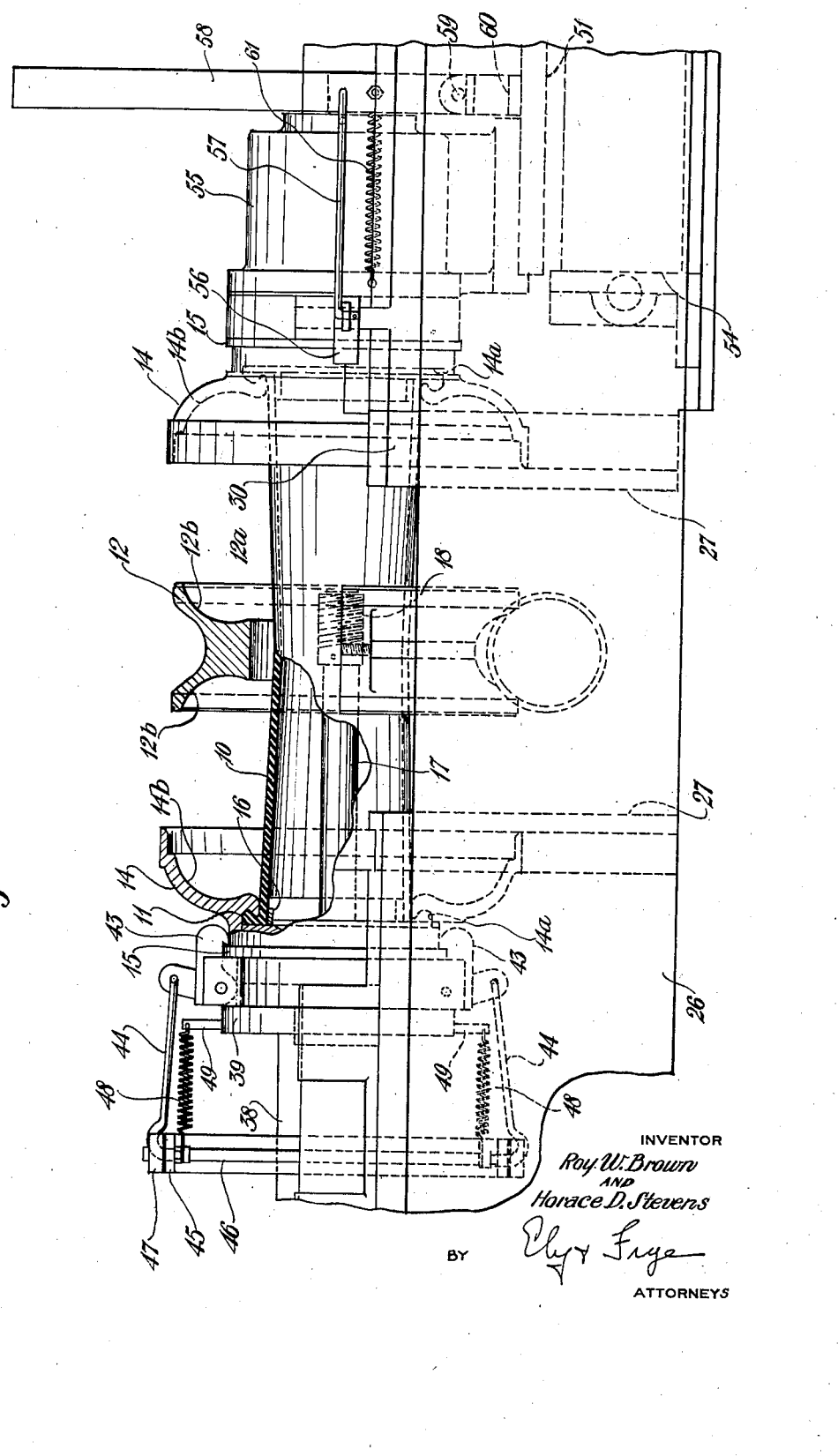
Figure 5 is a detail elevation of the shaping apparatus, and the work therein, before the latter is distended to bellows shape, parts thereof being broken away and in section.
Figure 6:
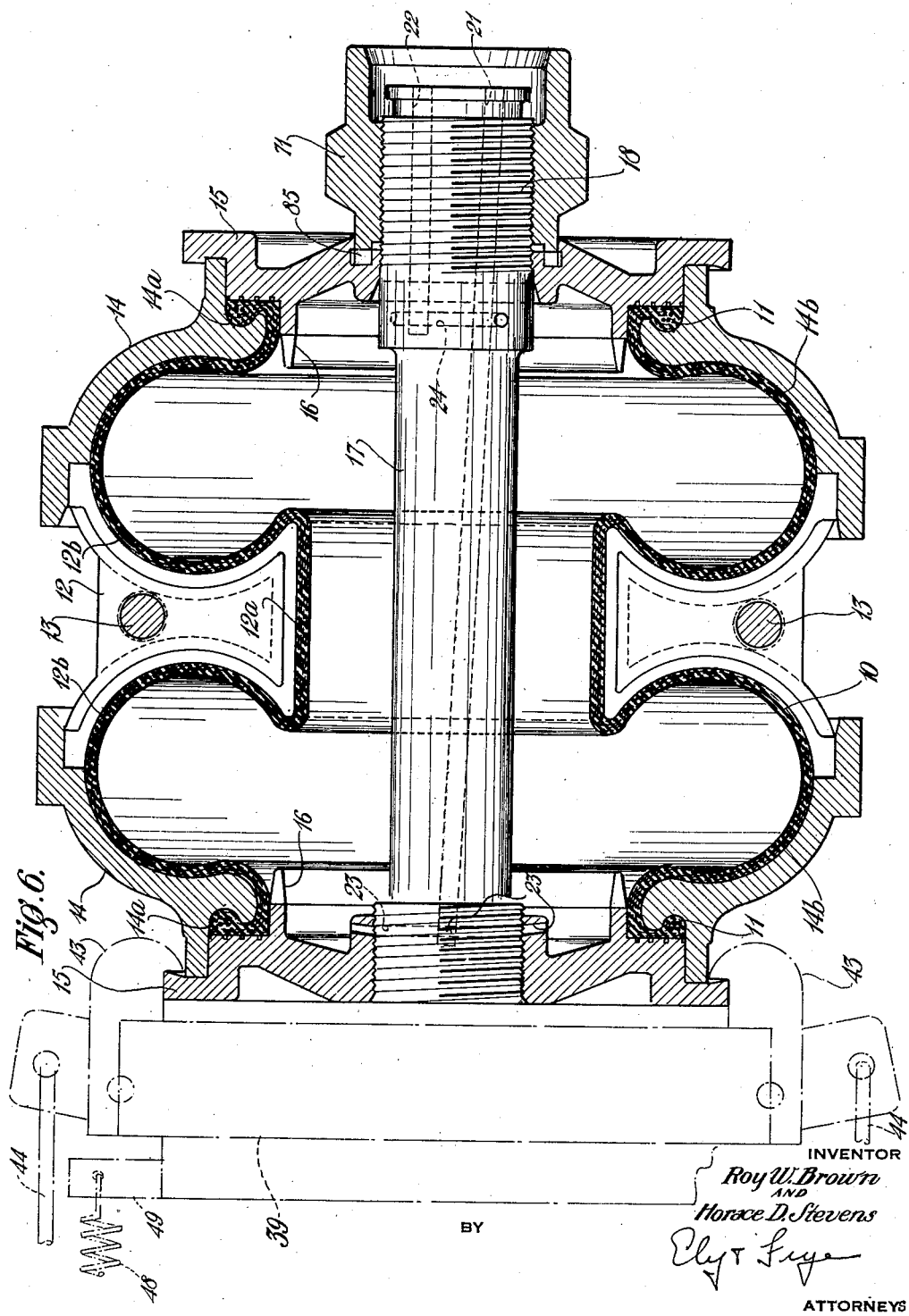
Figure 6 is a longitudinal sectional view of those elements of the apparatus that constitute a mold, and the work therein, after the latter has been distended to bellows shape.

Referring first to Figure 5 of the drawings, there is shown at 10 therein a hollow, tubular structure of fabric-reinforced, unvulcanized rubber composition, said structure having end portions that diverge or flare slightly from its middle, and is formed with outwardly turned flanges or beads 11 at its respective ends. In Figure 6 the structure 10 is shown enclosed in a sectional mold and shaped to bellows form, prior to vulcanization.

The mold that encloses the structure 10 comprises a two-piece, transversely divided, medial section 12, the respective halves of which are secured together by cap screws 13, 13 so that it constitutes an annular structure. The structure 41 comprises a cylindrical molding surface 12a, and two annular, concentric, concave molding surfaces 12b, 12b that are disposed radially outwardly of the molding surface 12a and have their inner perimeters joined to the opposite ends of the said surface 12a. The mold also comprises a pair of annular sections 14, 14 disposed coaxially of mold section 12 and arranged to telescope over the outer circumference of the latter in the closed condition of the mold. Each mold section 14 includes an annular, concentric, concave molding surface 14b that is aligned with a molding surface 12b of mold section 12. The mold structure includes respective axially apertured closure plates 15, 15 that interfit the inner perimeters of sections 14. Between them, each mold section 14 and its closure plate 15 defines a molding cavity 14a for one bead portion of the tubular structure 10. At the inner circumference of each molding cavity 14a the closure plate 15 is formed with a circumferential flange 16 that is disposed upon the inner circumference of the work for a purpose presently to be explained. One of the closure members 15 has a stem 17 permanently mounted in its axial aperture, said stem extending from the inner face of said member, toward the other member 15, and having its free end exteriorly threaded as shown at 18. In the closed condition of the mold, shown in Figure 6, the free end portion of stem 17 extends through the axial aperture in the other closure plate 15, and has a nut 19 screwed onto its threaded portion 18, there being a sealing gasket or washer 20 interposed between the nut and the adjacent face of plate 15. The stem 17 is formed with two internal bores or passages 21, 22 that extend thereinto from the free end thereof, passage 21 extending to the region of the stem that is fixed in the closure plate 15, and being intersected thereat by four radially outwardly extending passages 23, 23 that open into the interior of the mold. Passages 21, 23 enable fluid to be discharged into the structure 10 confined in the mold, the flange 16 of said closure plate preventing the incoming fluid from impinging directly against the work. The passage 22 is relatively short and is intersected by a transverse passage 24 that opens into the interior of the mold at the opposite end thereof from the passages 23. Passages 22, 24 constitute a drain for the mold. During vulcanization of the structure 10, water that is introduced into the mold is evacuated therefrom through passages 22, 24 by the pressure of vulcanizing fluid such as air and/or steam that is introduced into the mold through passages 21, 23.

The apparatus for assembling the mold sections about the distensible structure 10, and for concurrently distending the latter, is shown in Figures 1 to 4 of the drawings wherein 26 designates a table-like framework of the apparatus, 27, 27 designate semi-circular, cradle-like structures for supporting the respective mold sections 14, 14, and 28 designates a semi-circular, cradle-like support for the medial mold section 12, the support 28 being mounted upon the framework 26. As viewed in Figures 1 and 2 of the drawings, the support 27 at the left is mounted upon a slide 29 on framework 26 and support 27 at the right is mounted upon a slide 30 on said framework, said slides being provided with respective racks 31, 32 that extend toward each other and mesh with an idler pinion 33, at diametrically opposite points on the latter. A double-acting fluid pressure operated cylinder 34 is mounted upon the framework 26, at the left end thereof, the piston rod of said cylinder being connected to slide 29 by a connecting rod 35. The arrangement is such that the slide 29 may be moved from and toward the middle of framework 26 to carry one mold section 14 toward medial mold section 12, the other slide 30 being similarly and concurrently moved by reason of the intermeshed racks 31, 32 and pinion 33.

Slidably mounted upon rails 37, 37 on the top of framework 26, at the left end thereof, is a slide 38 that carries a head 39, the latter being connected to the outer end of piston rod 40 of a double-acting fluid pressure operated cylinder 41 that is mounted upon said framework 26. The head 39 is adapted to carry a closure member 15 of a mold upon the side thereof that is remote from cylinder 41. To this end latches 43, 43 are pivotally mounted upon the head at diametrically opposite points thereof, said latches being engageable over a peripheral flange of the closure member. Latches 43 are of angular, bell-crank shape, and each has an operating arm that is connected by a link 44 to a generally C-shaped lever 45 that is mounted upon a pivot pin 46, the latter being carried by a bracket 47 mounted upon slide 38. The latches 43 normally are yieldingly urged toward latching position by respective tension springs 48 that are connected at one end to fixed points, represented by studs 49, 49, on the head 39 and at their other ends are connected to separated points of the lever 45, adjacent the connections of the links 44 therewith.

The mold-section support 27 positioned at the right is mounted upon one end of the slide 30. The latter also has mounted thereon a slide 51 that is movable relatively thereof and in the same directions. For moving slide 51 relatively of slide 30, said slide 51 is provided with a downwardly projecting fixture 52 that is connected to the outer end of the piston rod 53 of a fluid pressure operated cylinder 54, the latter being mounted upon slide 30. Mounted upon that end of slide 51 that is nearest mold-support 27 is a head 55 that in some respects is similar to head 39 hereinbefore described in that it is adapted to support a mold-closure member 15. To this end the head 55 is provided at diametrically opposite points with pivotally mounted latches 56, 56 that are connected by respective links 57 to separated points of C-shaped lever 58. Said lever 58 is mounted upon a pivot pin 59 that is carried by a bracket 60, the latter being mounted upon slide 51. Tension springs 61, 61 connected at one end to fixed points on opposite sides of the head 55 and at their other end to the lever 58 normally urge the latches 56 to latching position. The head 55 is formed with an axial aperture (not shown) for receiving a socket wrench presently to be described.

Mounted upon the slide 51 for movement relatively thereof and in the same direction is a slide 64 upon which is mounted an air-driven wrench 65 that is substantially of standard construction. Pivotally mounted upon slide 51, laterally of wrench 65, is an operating lever 66 that extends transversely of the wrench and is connected thereto by a link 67, the arrangement being such that wrench and slide 64 may be moved relatively of slide 51 by means of said lever 66. Air for operating wrench 65 is conducted thereto through pipe 68, a portion of which is flexible, and in said pipe is a whistle valve 69 that is disposed below lever 66. By depressing the free end of lever 66, valve 69 is opened to admit air to the wrench 65 to operate the same. The end of wrench 65 that is nearest head 55 carries a rotatable socket member 70 in which is mountable a nut 71, Figure 6, that is threadable onto stem 17 of the mold. The socket member 70 is movable axially within the axial aperture in the head 55, for running the nut 71 onto the stem 17. Connected to the head 55 is a flexible fluid pressure conducting pipe 72, Figure 1, arranged to discharge air under pressure into the axial aperture in said head, and there is a suitable gasket (not shown) in said aperture and peripherally engaging the socket member 70 for preventing the escape of air past said socket member.

Below the framework 26 is an oil pump 74 driven by a motor 75. Extending from pump 74 is an oil pressure line 76 that has connection with three valves 77, 78 and 79 respectively. An oil-return line 80 to the pump 74 has connection with valves 78 and 79. Through suitable piping, valve 79 is connected to fluid pressure cylinders 41 and 54 and is adapted to operate them in unison. Also through suitable piping valves 77 and 78 are connected, in series, to operate fluid pressure cylinder 34, valve 77 being a relief valve for said cylinder as presently will be explained. Also positioned beneath the framework 26 is an air reservoir 82 that is charged by means of a supply pipe 83 that extends to a source of air compression (not shown). A suitable pressure reducing valve 81 is interposed in the line 83 between the external pressure source and the reservoir 82. The pipe 72 from the head 55 has connection with the reservoir, and there is a control valve (not shown) in pipe 72, which valve is operated by the lever 84. The pipe 68 to the wrench 65 is connected to the supply pipe 83.

The operation of the apparatus is as follows: The first step is the mounting of the nut 71 in the socket of the member 70 of the wrench 65, which step readily is effected before the closure plate 15 is mounted on the face of head 55. Thereafter the closure plates 15 are mounted upon the heads 39, 55, it being understood that said heads at this time are in the retracted positions shown. Next the annular mold sections 14 are mounted in the respective supports 27, and the lower half of medial mold section 12 is mounted upon its support 28. Then an unvulcanized tubular structure 10 is mounted in the apparatus, its medial portion overlying the lower half of mold section 12, the end portions of the tubular structure being inserted through the axial openings in mold sections 14, the slides 29, 30 being moved somewhat toward each other to enable this operation to be accomplished. Thereafter the upper half of mold section 12 is bolted to the lower half thereof to confine the medial portion of structure 10, after which the slides 29, 30 are moved apart to their extreme separated positions, in which positions the bead portions 11 of the structure 10 abut the outer lateral faces of mold sections 14. Cylinders 41 and 54 are then charged to move the respective heads 39 and 55 toward each other, and thereby to move the closure members 15 of the mold into engagement with the mold sections 14 thereof and thus to confine the bead portions 11 of the tubular work-structure 10, as is most clearly shown in Figure 5.

Thereafter cylinder 34 is operated to move slides 29, 30 toward each other, the charged cylinders 41, 54 continuing to hold the closure members 15 against the mold sections 14 as the latter move toward the medial mold section 12. Coincident with the charging of cylinder 34, the operator operates lever 84 to admit air under pressure to the head 55, where it passes into the work-structure 10 and distends the latter at each side of said medial mold section. Movement of the slides 29, 30 continues until mold sections 14 mate with medial mold section 12, by which time the work structure is distended against the walls of the closed mold as is shown in Figure 6. The operator then manipulates lever 66 to move the wrench 65 toward head 55, and to open whistle valve 69 to drive the wrench and thus to rotate socket member 70 thereof, with the result that nut 71 is threaded tightly onto stem 17. Preferably a gasket 85 is interposed between the nut 71 and the adjacent closure member 15. As soon as nut 71 is fully set up, the wrench 65 is moved to its retracted position and the air flowing to head 55 is shut off, the air within the work-structure in the mold thereafter escaping through the passages 21, 22 in the stem 17. Valve 77 is then operated to relieve the pressure on the mold exerted by cylinder 34, after which the latches engaging end closures 15 are opened and the assembled mold with work therein, as shown in full lines in Figure 6, is removed from the apparatus. The other valves are then operated to restore the operative elements of the apparatus to original position, which completes the cycle of operation. The assembled mold may then be mounted in a suitable vulcanizer and the work therein vulcanized under heat and internal pressure, preferably in the following manner.

The assembled mold is mounted in the vulcanizer in such a position that the ports 23 in the stem 17 are uppermost. Then air under pressure is admitted through passage 21 and ports 23 in stem 17, which air passes to the interior of the work and forces the same into conformity with the molding cavity of the mold, the air pressure building up to about 80 pounds. Thereafter the air pressure is released and cold water is admitted to the interior of the work, through passages 22, 24 of the stem 17, so as completely to replace the air. As soon as the air is completely evacuated, the air vent, that communicates with passage 21, is closed and the hydraulic pressure is built up to 200 pounds per square inch. With the work in the condition described, the exterior of the mold is subjected to vulcanizing heat. After about 15 minutes the passage 21 again is opened and hot water at 290° F. is circulated through the work for the remainder of the vulcanizing period. The hot water entering through the passage 22 strikes the flange 16 of the end plate 15, thus preventing the water from impinging directly against the inner surface of the bellows structure 10 and overcuring the same. After vulcanization the water is drained from the interior of the work in the usual manner.

The invention rapidly and efficiently effects the shaping of a distensible article in a mold, and achieves the other advantages set out in the foregoing statement of objects.

Modification may be resorted to without departing from the spirit of the invention or the scope thereof as defined by the appended claims.

What is claimed is:

1. In apparatus for shaping hollow, distensible structures, the combination of a cavity mold of which the molding cavity is defined by a series of axially aligned separable annular mold sections adapted to receive a distensible tubular work-structure, means for moving the two outermost sections of the series into engagement with two sections adjacent to them to confine the respective end portions of the work-structure, means for moving the two pairs of mold sections aforesaid toward each other while the sections of each pair remain engaged, and means for inflating the work-structure as said pairs of mold sections approach each other.

2. In apparatus for shaping hollow distensible structures, the combination of a cavity mold comprising a plurality of axially separable mold sections consisting of an annular medial section, annular lateral sections at each side thereof, and end closures for said lateral sections, a stationary support for the medial section, respective movable supports for the lateral sections, respective movable supports for the end closures, means for concurrently moving both end closures into engagement with the lateral sections, and means for concurrently moving lateral sections and end closures toward the medial section.

3. In apparatus for shaping hollow distensible structures, the combination of a cavity mold comprising a plurality of axially separable mold sections consisting of an annular medial section, annular lateral sections at each side thereof, and end closures for said lateral sections, a stationary support for the medial section, respective movable supports for the lateral sections, respective movable supports for the end closures, means for concurrently moving both end closures into engagement with the lateral sections to confine the respective end portions of a tubular distensible work-structure therebetween, means for concurrently moving lateral sections and end closures toward the medial section to close the mold, and means for inflating the work structure concurrently with the closing of the mold.

4. A combination as defined in claim 3 in which the inside diameter of the medial mold section is so small as to prevent distention of the work-structure in the medial region thereof.

5. A combination as defined in claim 3 in which the medial mold section is transversely divided to enable it to be removed from the distended article.

6. In apparatus for shaping hollow distensible structures, the combination of a cavity mold comprising a plurality of axially separable mold sections consisting of an annular medial section, annular lateral sections at each side thereof, and end plates for said lateral sections, one of said end plates having a threaded axial stem and the other end plate having an axial opening for receiving said stem, means for moving said sections toward each other into mating relation to confine a distensible tubular article therein, means for admitting air under pressure to the interior of said article as the mold closes thereon, and means for threading a retaining nut onto the free end of said stem, while the pressure is maintained in said article.

7. A combination as defined in claim 6 in which the threaded stem is formed with a passage extending from the interior of the article to the outer end of the stem.

8. Apparatus for shaping hollow distensible structures, said apparatus comprising a mold consisting of an annular medial section, annular lateral sections at each side thereof and matable therewith, closure plates for the ends of said lateral sections, said closure plates and lateral sections being so shaped and arranged as to apply mechanical pressure to local regions of a tubular work-structure confined in said mold, and means for applying fluid pressure to the remainder of said work-structure in the mold.

9. Apparatus for shaping hollow distensible structures, said apparatus comprising a plurality of axially separable mold sections consisting of an annular medial section, annular lateral sections at each side thereof and matable therewith, closure plates for the ends of said lateral sections, said lateral sections and closure plates being adapted to confine the respective end portions of a tubular work-structure mounted in said mold, one of said closure plates being provided with a threaded stem that extends axially through the mold and through the other closure plate, and a nut on the free end of said stem, exteriorly of the mold, for maintaining the mold in closed condition.

10. A combination as defined in claim 9 in which the threaded stem is formed interiorly with a passage by means of which fluid is conducted to and from the interior of an article in the mold.

11. Apparatus for shaping hollow distensible structures, said apparatus comprising a plurality of axially separable mold sections consisting of an annular medial section, annular lateral sections at each side thereof and matable therewith, closure plates for the ends of said lateral sections, said lateral sections and closure sections being so constructed and arranged as to confine therebetween the respective end portions of a tubular work-structure mounted in said mold, one of said closure plates being provided with a threaded stem that extends axially through the mold and through the other closure plate, a nut on the free end of the stem for maintaining the mold in closed condition, said stem being formed interiorly with a passage by means of which fluid is conducted to the interior of an article in the mold, and means on one of the end closures for preventing incoming fluid from impinging directly upon the surface of the article in the mold.

12. In apparatus for shaping hollow distensible structures, the combination of a mold comprising a molding cavity defined by a series of axially separable annular mold sections of which the end sections at least are arranged in pairs, means for confining each end portion of a tubular distensible work-structure between respective pairs of end sections of the mold, means for moving the said pairs of end sections toward each other to close the mold, and means for admitting fluid under pressure to the interior of said work-structure concurrently with the closing of the mold to distend the work-structure against the wall of the cavity of the mold.

13. In apparatus for shaping hollow distensible structures, the combination of a mold comprising a molding cavity defined by an axially aligned series of separable annular mold sections of which the end sections at least are arranged in pairs, means for confining opposite end portions of a tubular distensible work-structure between respective pairs of end sections of the mold, means for moving the said pairs of end sections toward each other to close the mold, means for admitting fluid under pressure to the interior of said work-structure concurrently with the closing of the mold to distend the work-structure against the wall of the cavity of the mold as the latter closes, said mold comprising a central section that so circumscribes the work-structure as to cause distension thereof to occur in spaced local regions on opposite sides of said central section.

ROY W. BROWN.
HORACE D. STEVENS.